(12) United States Patent
Lin et al.

(10) Patent No.: US 7,666,114 B2
(45) Date of Patent: Feb. 23, 2010

(54) ELECTRIC VARIABLE INERTIA APPARATUS

(75) Inventors: Bor-Jeng Lin, Yunlin Hsien (TW);
Mi-Ching Tsai, Tainan (TW);
Cheng-Chi Huang, Tainan (TW);
Li-Jung Tu, Tainan (TW)

(73) Assignee: National Formosa University (TW)

( * ) Notice: Subject to any disclaimer, the term of this patent is extended or adjusted under 35 U.S.C. 154(b) by 274 days.

(21) Appl. No.: 11/650,431

(22) Filed: Jan. 8, 2007

(65) Prior Publication Data

US 2008/0167156 A1  Jul. 10, 2008

(51) Int. Cl.
*F16H 33/08* (2006.01)
(52) U.S. Cl. .............................. 475/267; 475/5; 475/149
(58) Field of Classification Search .................. 475/5, 475/149, 150, 267; 180/65.2–65.6, 369, 180/372
See application file for complete search history.

(56) References Cited

U.S. PATENT DOCUMENTS

| | | | | | |
|---|---|---|---|---|---|
| 3,022,433 | A | * | 2/1962 | Ferranti | 310/74 |
| 3,267,311 | A | * | 8/1966 | Lamparty | 310/115 |
| 4,233,858 | A | * | 11/1980 | Rowlett | 475/5 |
| 4,423,784 | A | * | 1/1984 | Bolen | 169/62 |
| 4,437,016 | A | * | 3/1984 | Nakaya et al. | 290/1 R |
| 5,309,778 | A | * | 5/1994 | Antonov | 74/15.86 |
| 5,382,854 | A | * | 1/1995 | Kawamoto et al. | 310/67 R |
| 6,373,160 | B1 | * | 4/2002 | Schrodl | 310/114 |
| 6,394,924 | B1 | * | 5/2002 | Schiebold et al. | 475/5 |
| 6,477,918 | B2 | * | 11/2002 | Sakamoto | 74/640 |
| 6,833,644 | B1 | * | 12/2004 | Lee | 310/98 |
| 7,276,005 | B2 | * | 10/2007 | Morikawa | 475/5 |
| 7,549,939 | B2 | * | 6/2009 | Strauss et al. | 475/5 |
| 7,556,580 | B2 | * | 7/2009 | Saito et al. | 475/154 |

* cited by examiner

*Primary Examiner*—David D Le
*Assistant Examiner*—Justin Holmes
(74) *Attorney, Agent, or Firm*—Hershkovitz & Associates, LLC; Abraham Hershkovitz

(57) ABSTRACT

An electric variable inertia apparatus uses a servo drive device to drive a planetary gear mechanism to which a load assembly is attached to provide variable and wide-ranging rotational inertia. A planetary frame and a ring gear of the planetary gear mechanism act as two input ends of the electric variable inertia apparatus, and a rotated shaft of a sun gear assembly of the planetary gear mechanism acts as a load terminal. The load assembly is rotated at a controlled rotational velocity with the ring gear to generate a widely ranging rotational inertia to change a dissipating degree of an input energy from the planetary frame. The electric variable inertia apparatus can be used in different fields such as shock absorbers, stabilizers, dampers or vibrators in the automotive field, etc.

2 Claims, 6 Drawing Sheets

ELECTRIC VARIABLE INERTIA APPARATUS

BACKGROUND OF THE INVENTION

1. Field of the Invention

The present invention relates to an electric variable inertia apparatus, and more particularly to an electric variable inertia apparatus that uses a servo drive device to drive a ring gear of a planetary gear mechanism connected to a kinetic energy storing device to provide variable and wide-ranging rotational inertia.

2. Description of Related Art

Inertia apparatuses can be used in different applications such as shock absorbers, stabilizers, dampers or vibrators in the automotive, precision machinery, building, health protection equipment, leisure fitness equipment, etc.

However, conventional Inertia apparatuses generate insufficient rotational inertia and are not able to generate variable rotational inertia so the Inertia apparatus cannot be adjusted to generate adequate rotational inertia under different conditions that results in the Inertia apparatus being inconvenient and inefficient.

SUMMARY OF THE INVENTION

The main objective of the present invention is to provide an electric variable inertia apparatus to generate variable and wide-ranging rotational inertia under different conditions, which can be used in different fields.

The electric variable inertia apparatus in accordance with the present invention comprises a servo drive device, a planetary gear mechanism and a load assembly.

The servo drive device is connected electrically to a control unit to be controlled to provide a variable rotatory driving force depending on different situations and may be an external motor. The external motor has an internal stator and an external rotor. The external rotor encloses the internal stator and is connected electrically to a control unit to rotate the external rotor at variable rotational speeds.

The planetary gear mechanism has a ring gear, a planet gear assembly and a sun gear assembly. The planet gear assembly has a planetary frame and multiple planet gears. The planetary frame is connected to an external input device. The planet gears are mounted on the planetary frame and mesh with the ring gear. The sun gear assembly has a rotated shaft and a sun gear. The rotated shaft has a front end and a rear end. The sun gear is mounted at the front end of the rotated shaft and meshes with the planet gears.

The load assembly has a kinetic energy storing device mounted on the rear end of the rotated shaft of the sun gear assembly of the planetary gear mechanism and rotates simultaneously with the rotated shaft to generate rotational inertia that has a magnitude.

The magnitude of the rotational inertia generated by the kinetic energy storing device depends on the rotational speed of the rotated shaft, the external rotor and the planetary frame. Since the rotational speed of the planetary frame depends on the external input device, rotational speed of the kinetic energy storing device is controllable and adjustable by appropriately changing the rotational speed of the external rotor. Additionally, the gear ratio between the ring gear and the sun gear allows the rotational inertia generated by the kinetic energy storing device to be significantly magnified.

Combining the external motor with a planetary gear mechanism, the function of continuous transmission can be achieved by controlling the velocity of the motor appropriately.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
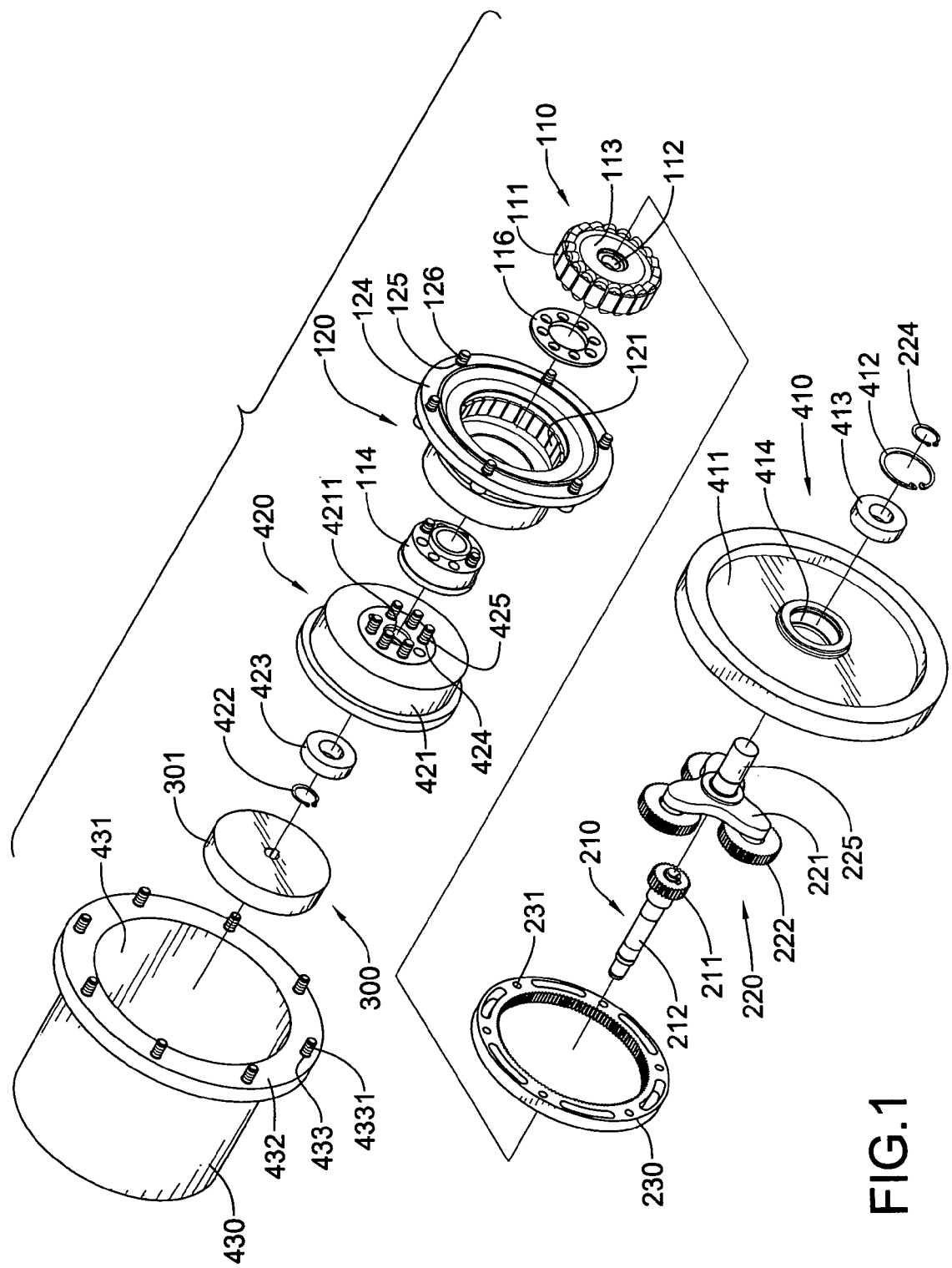
FIG. 1 is an exploded perspective view of an electric variable inertia apparatus in accordance with the present invention.
Figure 2:
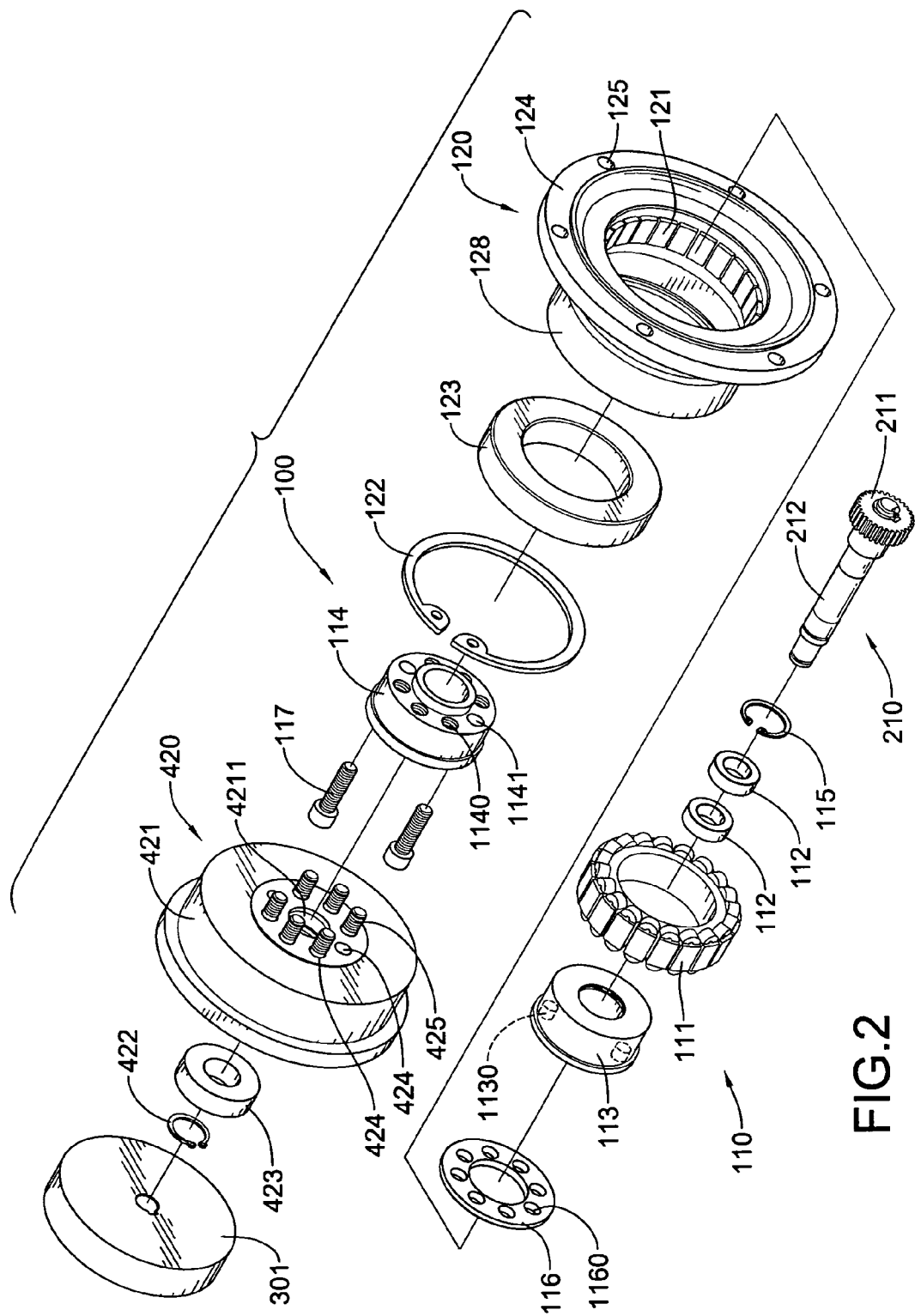
FIG. 2 is an exploded perspective view of part of the electric variable inertia apparatus in FIG. 1 with an exploded internal stator.

With reference to FIGS. 1 and 2, an electric variable inertia apparatus in accordance with the present invention comprises a housing assembly, a servo drive device (100), a planetary gear mechanism and a load assembly (300).

The housing assembly has a housing (430), a positioning assembly (420) and a cover assembly (410).

Figure 4:
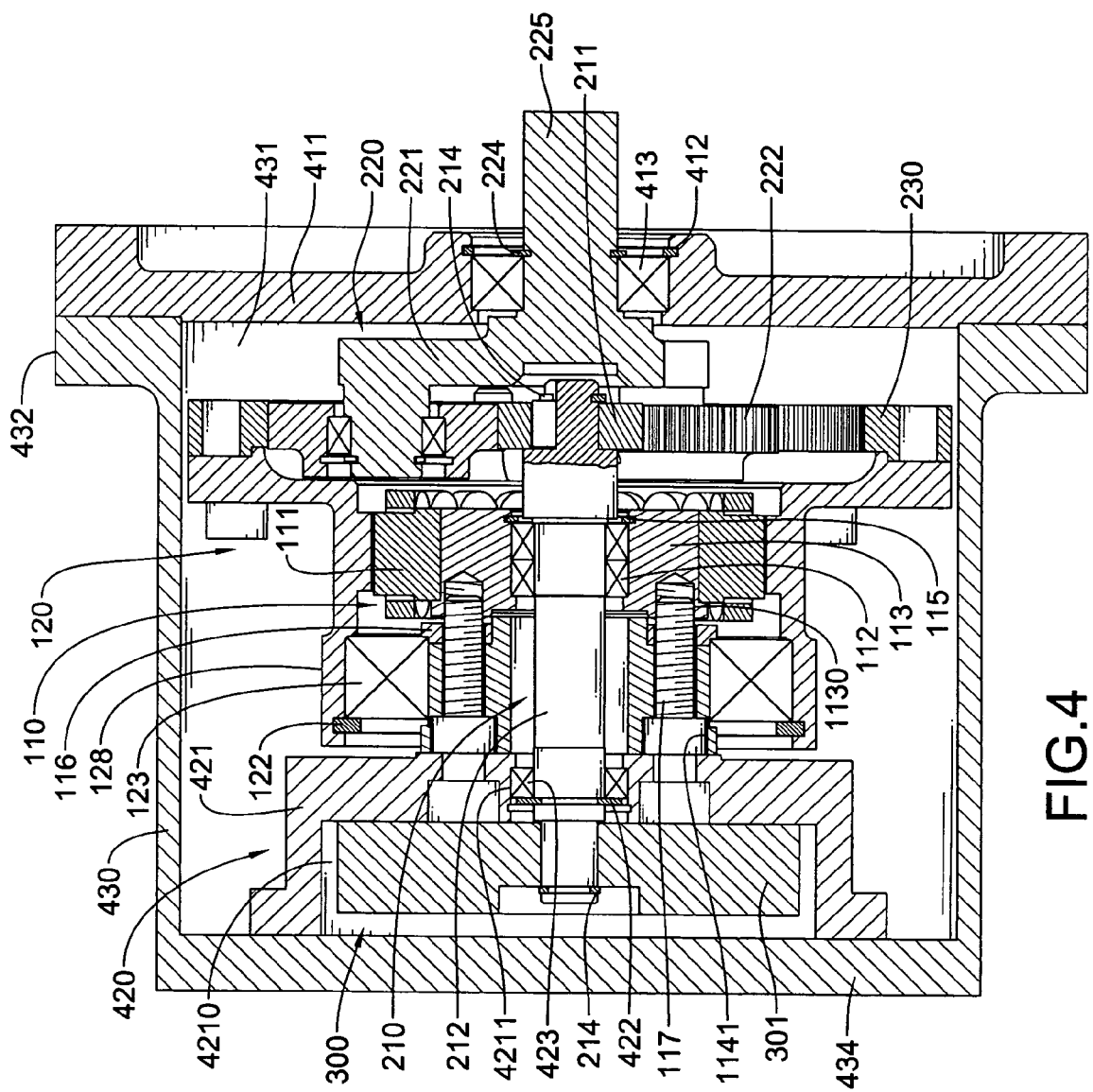
FIG. 4 is a side view in partial section of the electric variable inertia apparatus in FIG. 1.
Figure 5:
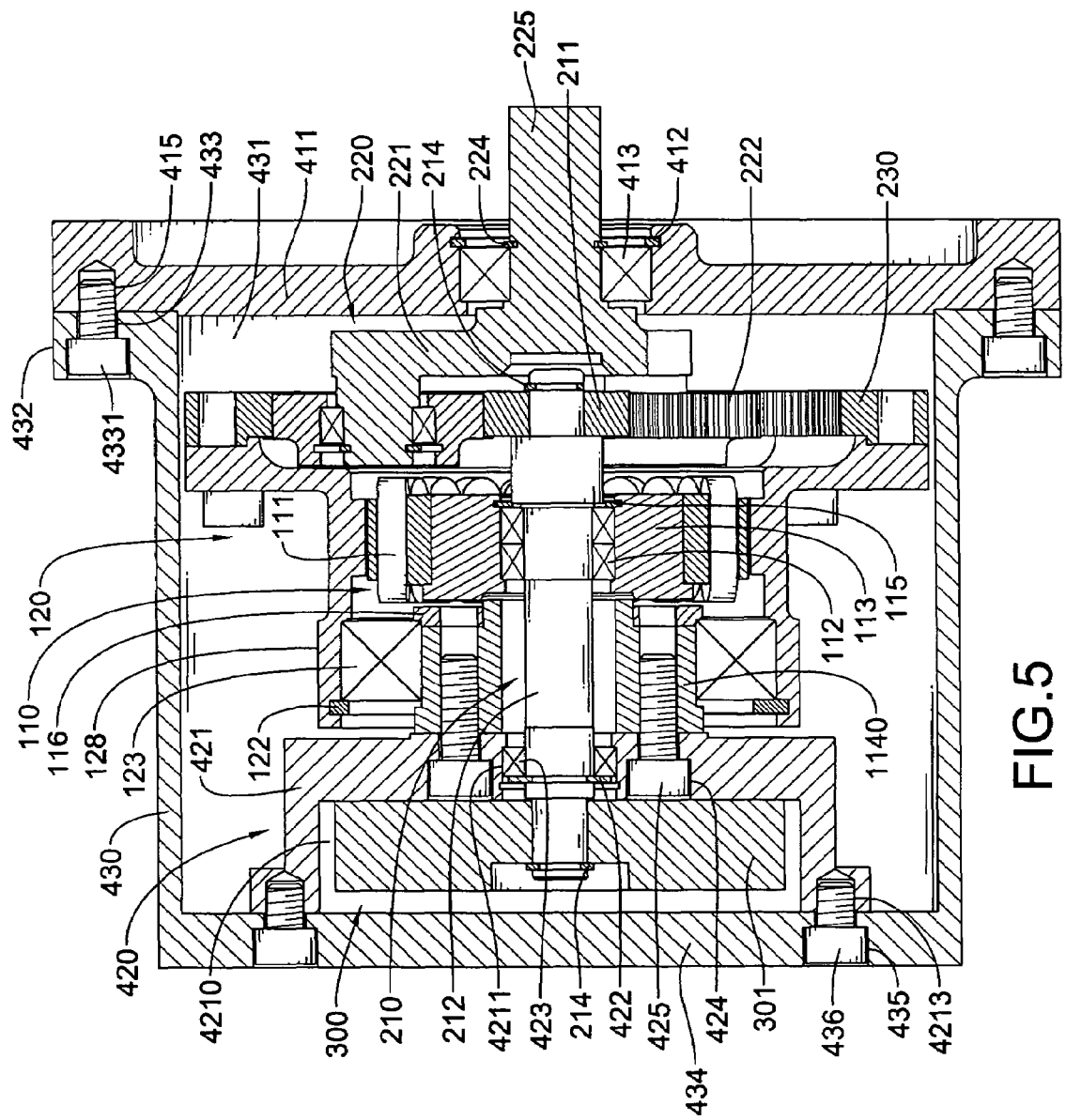
FIG. 5 is a side view in another partial section of the electric variable inertia apparatus in FIG. 1.

With further reference to FIGS. 4 and 5, the housing (430) has a closed rear (434), an open front (431) and an optional flange (432). The closed rear (434) has multiple optional base mounting holes (435). The base mounting holes (435) are formed through the closed rear (434) of the housing (430). The flange (432) is formed on and protrudes radially out from the open front (431) of the housing (430) and has multiple cover mounting holes (433). The cover mounting holes (433) are formed through the flange (432).

The positioning assembly (420) is mounted securely in the housing (430) and has a base (421), an optional sleeve (114), a rear shaft bearing (423) and an optional retaining disk (116).

The base (421) is mounted securely in the housing (430) and has a front, a rear, a cavity (4210), a central hole (4211), multiple optional sleeve mounting holes (424), multiple threaded holes (4213) and multiple optional base fasteners (436). The cavity (4210) is formed coaxially in and communicates with the rear of the base (421). The central hole (4211) is formed coaxially through the front of the base (421), communicates with the cavity (4210) and has a narrow end and a broad end. The narrow end communicates with the front of the base (421). The broad end communicates with the cavity (4210). The sleeve mounting holes (424) are formed through the front of the base (421) around the central hole (4211). The threaded holes (4213) are formed in the rear of the base (421) around the cavity (4210). The base fasteners (436) are mounted through the base mounting holes (435) in the closed rear (434) of the housing (430) and screw respectively into the threaded holes (4213) in the rear of the base (421) to mount the base (421) securely in the housing (430).

The sleeve (114) is mounted securely on the front of the base (421) and has multiple optional threaded holes (1140), multiple optional disk mounting holes (1141) and multiple optional sleeve fasteners (425). The threaded holes (1140) are formed longitudinally through the sleeve (114). The disk mounting holes (1141) are formed longitudinally through the sleeve (114). The sleeve fasteners (425) are mounted through the sleeve mounting holes (424) and screw respectively into the threaded holes (1140) in the sleeve (114) to mount the sleeve (114) securely on the front of the base (421).

The rear shaft bearing (423) is mounted in the broad end of the central hole (4211).

The retaining disk (116) is mounted securely on the sleeve (114) and has a central hole and multiple optional through holes (1160). The central hole is formed through the retaining disk (116). The through holes (1160) are formed through the retaining disk (116) around the central hole in the retaining disk (116).

The cover assembly (410) is mounted securely on the open front (431) of the housing (430) and has a cover (411), a frame shaft bearing (413) and an optional C-clip (412). The cover (411) is mounted securely on the open front of the housing (430) and has a rear, a central hole (414), multiple optional threaded holes (415) and multiple optional cover fasteners (4331). The central hole (414) is formed through the cover (411) and has an inner surface. The threaded holes (415) are formed in the rear of the cover (411) and align respectively with the cover mounting holes (433) in the flange (432) on the housing (430). The cover fasteners (4331) are mounted through the cover mounting holes (433) in the flange (432) on the housing (430) and screw respectively into the threaded holes (415) in the cover (411) to mount the cover (411) securely on the open front (431) of the housing (430). The frame shaft bearing (413) is mounted in the central hole (414) in the cover (411). The C-clip (412) is mounted in the inner surface of the central hole (414) in the cover (414) to hold the frame shaft bearing (413) in the central hole (414) in the cover (411).

The servo drive device (100) is mounted in the housing (430) between the base (421) and the cover (411), is connected electrically to a control unit to be controlled to provide a variable rotatory driving force depending on different situations and may be implemented in several ways.

In a preferred embodiment of the servo drive device (100), the servo drive device (100) is an external motor and has an internal stator (110) and an external rotor (120).

The internal stator (110) is mounted securely in the housing (430) and may have a collar (113), a coil assembly (111), at least one front shaft bearing (112) and an optional C-clip (115). The collar (113) has a rear, a cylinder surface, a central hole, multiple optional threaded holes (1130) and multiple optional stator fasteners (117). The central hole in the collar (113) has an inner surface. The threaded holes (1130) are formed in the rear of the collar (113). The stator fasteners (117) are mounted through the disk mounting holes (1141) in the sleeve (114) and the through holes (1160) in the retaining disk (116) and screw respectively into the threaded holes (1130) in the collar (113) of the internal stator (110) to mount the internal stator (110) securely in the housing (430). The coil assembly (111) encircles the cylinder surface of the collar (113). The at least one front shaft bearing (112) is mounted in the central hole in the collar (113). The C-clip (115) is mounted in the inner surface of the central hole in the collar (113) to hold the at least one front shaft bearing (112) in the central hole in the collar (113).

The external rotor (120) is mounted rotatably in the housing (430) around the internal stator (110), is connected electrically to the control unit to be rotated at a desired speed depending on the situations and may have a tubular body (128), a flange (124), a magnet assembly (121), an optional sleeve bearing (123) and an optional C-clip (122). The tubular body (128) is mounted rotatably around the sleeve (114) and the internal stator (110) and has an inner surface, a front end and a rear end. The flange (124) is formed on and protrudes radially out from the front end of the tubular body (128) of the external rotor (120) and has multiple optional ring mounting holes (125). The ring mounting holes (125) are formed through the flange (124) on the external rotor (120). The magnet assembly (121) is mounted on the inner surface of the tubular body (128) near the front end of the tubular body (128) rotatably around the coil assembly (111) of the internal stator (110). The sleeve bearing (123) is mounted in the tubular body (128) near the rear end of the tubular body (128) and is mounted around the sleeve (114). The C-clip (122) is mounted in the inner surface of the tubular body (128) near the rear end of the tubular body (128) to hold the sleeve bearing (123) in the tubular body (128).

In an another embodiment, the servo drive device (100) may be a servo decelerator being connected electrically to the control unit to be controlled to achieve the same purpose of providing a variable rotatory driving force depending on different situations.

Figure 3:
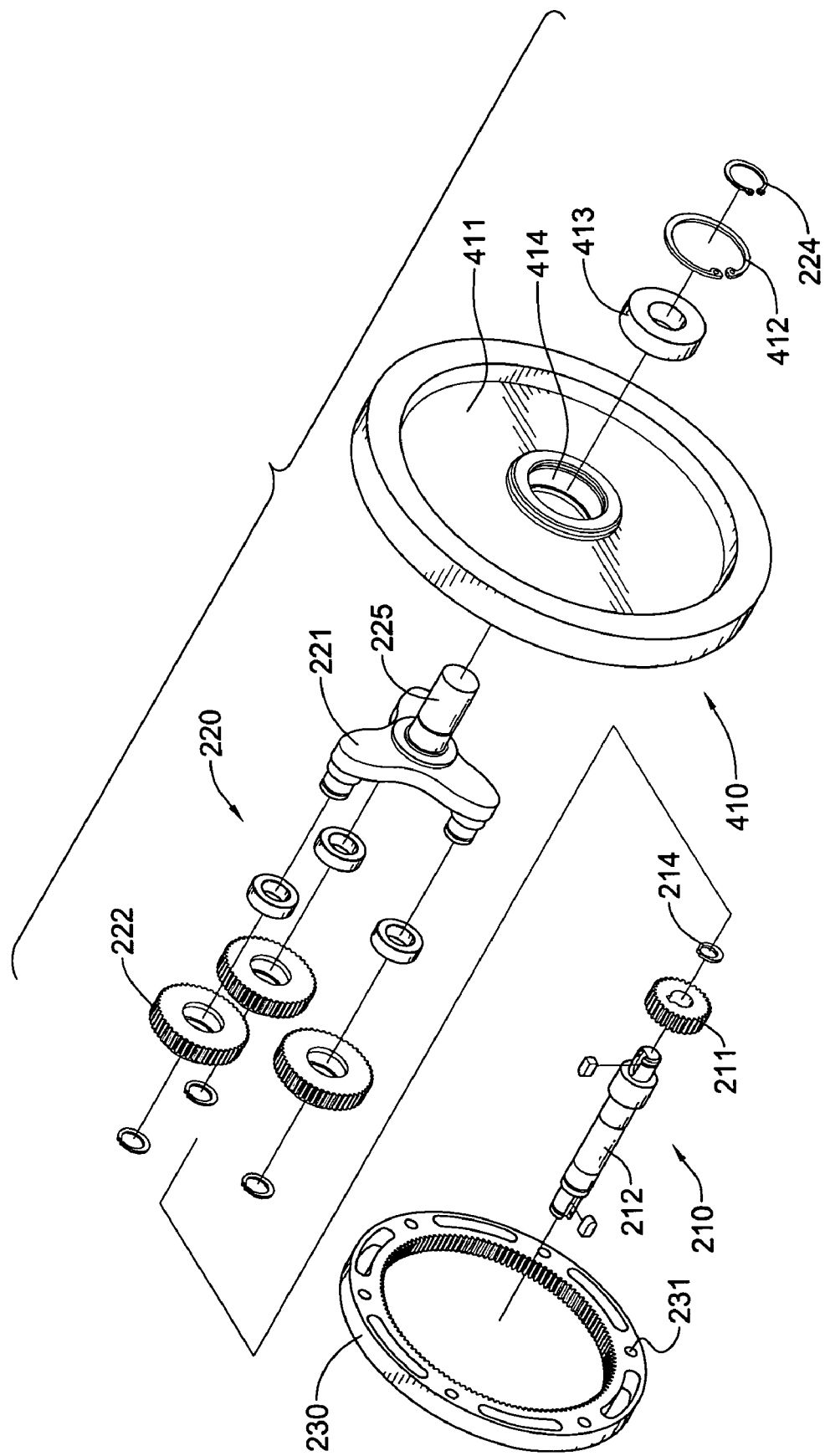
FIG. 3 is an exploded view of a planetary gear mechanism in the electric variable inertia apparatus in FIG. 1.

With further reference to FIG. 3, the planetary gear mechanism is mounted in the housing (430) between the servo drive device (100) and the cover (411) and has a ring gear (230), a planet gear assembly (220) and a sun gear assembly (210).

The ring gear (230) is connected to and driven by the servo drive device (100) and may be mounted securely on and simultaneously rotate with the external rotor (120). The ring gear (230) has a rear, a toothed inner surface, multiple optional threaded holes (231) and multiple optional ring fasteners (126). The threaded holes (231) are formed in the rear of the ring gear (230). The ring fastener (126) are mounted through the ring mounting holes (125) in the flange (124) on the external rotor (120) and screw respectively into the threaded holes (231) in the ring gear (230) to mount the ring gear (230) securely on the external rotor (120).

Additionally, the servo drive device (100) may include a drive motor (not shown) and a belt (not shown). The drive motor provides a variable rotatory driving force. The belt is driven by the drive motor, is mounted around the ring gear (230) to drive the ring gear (230).

The planet gear assembly (220) is mounted in and engages the ring gear (230) and has a planetary frame (221) and multiple planet gears (222). The planetary frame (221) is mounted in the housing (430), is connected to an external input device (900) and has an optional external drive shaft (225) and an optional C-clip (224). The external drive shaft (225) protrudes out of the frame shaft bearing (413) in the cover (411), is connected to the external input device (900) and has an outer surface. The C-clip (224) is mounted in the outer surface of the external drive shaft (225) of the planetary frame (221) and abuts the frame shaft bearing (413) to hold the frame shaft bearing (413) in the central hole (414) in the cover (411).

The planet gears (222) are mounted on the planetary frame (221) and mesh with the toothed inner surface of the ring gear (230).

The sun gear assembly (210) is mounted in the housing (430) and has a rotated shaft (212) and a sun gear (211). The rotated shaft (212) is mounted through the at least one front shaft bearing (112) in the collar (113) of the internal stator (110), the sleeve (114), the central hole in the retaining disk (116) and the rear shaft bearing (423) in the broad end of the central hole (4211) in the base (421) and has a front end, a rear end, an outer surface and an optional C-clip (422). The rear end of the rotated shaft (212) extends into the cavity (4210). The C-clip (422) is mounted in the outer surface of the rotated shaft (212) in the broad end of the central hole (4211) and abuts the rear shaft bearing (423) to hold the rear shaft bearing (423) in the central hole (4211).

The sun gear (211) is mounted securely on the front end of the rotated shaft (212), meshes with the planet gears (222) and has an optional C-clip (214). The C-clip (214) is mounted in the outer surface of the rotated shaft (212) and abuts the planet gear (222) to hold the sun gear (211) on the front end of the rotated shaft (212).

The load assembly (300) is mounted in the cavity (4210) in the base (421) and has a kinetic energy storing device (301). The kinetic energy storing device (301) is connected securely to the rear end of the rotated shaft (212) of the sun gear assembly (210), rotates simultaneously with the rotated shaft (212) to generate rotational inertia and may be a flywheel or may be connected with multiple magnetoresistance effect elements to generate variable rotational inertia. The kinetic energy storing device (301) has an optional C-clip (214). The C-clip (214) is mounted in the outer surface of the rotated shaft (212) and abuts the kinetic energy storing device (301) to hold the kinetic energy storing device (301) on the rear end of the rotated shaft (212).

Figure 6:
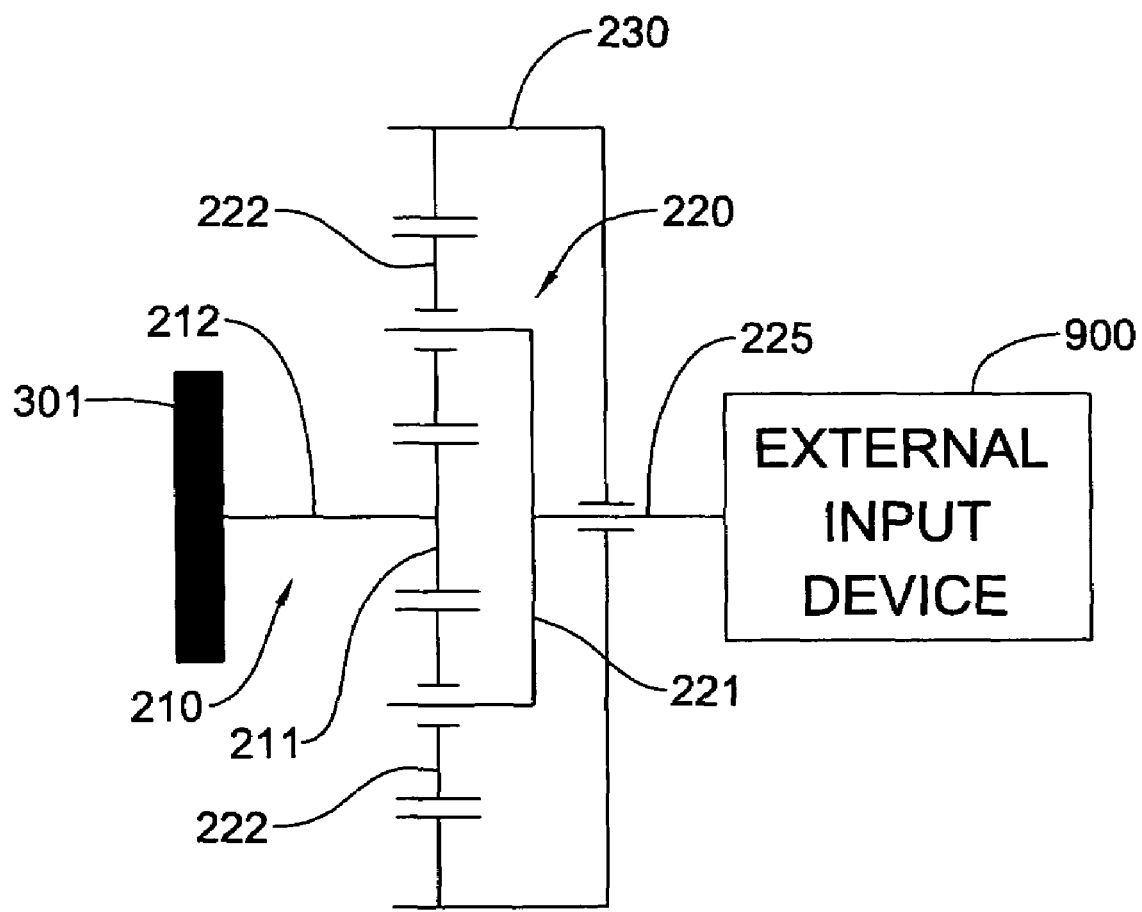
FIG. 6 is a schematic diagram of the planetary gear mechanism and a kinetic energy storing device of the electric variable inertia apparatus in FIG. 1.

With further reference to FIG. 6, the planetary frame (221) and the ring gear (230) act as two input ends of the electric variable inertia apparatus, and the rotated shaft (212) of the sun gear assembly (210) acts as an load terminal of the electric variable inertia apparatus. The following is to analysis relationships of rotational velocities and torques between the input ends and the load terminal of the electric variable inertia apparatus, wherein $n_s$ represents the rotational velocity of the sun gear (211) in r.p.m. (Revolutions per minute), $n_p$ represents a rotational velocity of the planetary frame (221) in r.p.m. (Revolutions per minute), $n_r$ represents a rotational velocity of the ring gear (230) in r.p.m. (Revolutions per minute), $T_o$ represents torque of the rotated shaft (212), $T_a$ represents torque of the planetary frame (221), $T_r$ represents torque of the ring gear (230), $r_p$ represents pitch radius of the planet gear (222), $r_s$ represents pitch radius of the sun gear (211), $r_i$ represents a ratio of the pitch radius of the planet gear (222) to the pitch radius of the sun gear (211) and equals $$\frac{r_p}{r_s},$$

$I_a$ represents rotational inertia of the planetary frame (221), $I_r$ represents rotational inertia of the ring gear (230), $I_s$ represents rotational inertia of the sun gear (211), $\alpha_a$ represents angular acceleration of the planetary frame (221), $\alpha_p$ represents acceleration of the planet gear (222), $\alpha_r$ represents angular acceleration of the ring gear (230), $\alpha_s$ represents angular acceleration of the sun gear (211) and $m_p$ represents mass of a planet gear (222). The rotating velocity and the load torque are $$n_s = 2(1+r_i)\cdot n_a - (1+2r_i)\cdot n_r$$

$$T_o = \frac{1}{1+r_i}\cdot(T_a - I_a\alpha_a) + \frac{1}{1+2r_i}\cdot(T_r - I_r\alpha_r) - r_s 3 m_p a_p - I_s\alpha_s$$

When the external input device (900) maintains a constant rotational velocity, the electric variable inertia apparatus can be controlled and discussed in three main ways.

(1) When the servo drive device (100) maintains a constant rotational velocity equaling to $$n_r = \frac{2(1+r_i)}{1+2r_i}\cdot n_a$$

and rotates in the same direction as the planetary frame (221), $n_s$=0 rpm, so that the kinetic energy storing device (301) is static and does not exerts any reactive torque to the input ends.

(2) When the servo drive device (100) is static ($n_r$=0), the angular velocity of the rotated shaft (212) is $$n_s = 2(1+r_i)\cdot n_a,$$

the kinetic energy storing device (301) imposes a torque on the external drive shaft (225) of the planetary frame (221) to restrain the impact action. The torque is $$T_a = (1+r_i)[T_o + 3r_s m_p a_p + I_s\alpha_s] - \frac{1+r_i}{1+2r_i}\cdot(T_r - I_r\alpha_r) + I_a\alpha_a$$

where the torque of the rotated shaft (212) is $$T_o = I_w\cdot\alpha = I_w\cdot\frac{\Delta\omega}{\Delta t},$$

$I_w$ represents rotational inertia of the kinetic energy storing device (301), $\omega$ represents angular velocity of the kinetic energy storing device (301).

If $\Delta t$ represents the responsive time of the external motor from $$n_r = \frac{2(1+r_i)}{1+2r_i}\cdot n_a$$

to $n_r$=0, the alternate angular velocity in rad/s (Radians per second) and the torque at the load terminal, without consideration to other actions, are $$\Delta\omega = \omega_2 - \omega_1 = [2(1+r_i)\cdot(n_a\cdot 2\pi/60)] - 0$$

$$T_o = I_w\cdot\frac{\Delta\omega}{\Delta t} = I_w\cdot\frac{2(1+r_i)\cdot(n_a\cdot 2\pi/60)}{\Delta t}$$

Neglecting the terms which contain $T_r$, $\alpha_a$, $\alpha_r$, $\alpha_s$ or $\alpha_p$ a torque that the load terminal reacts to the input terminal, the external drive shaft (225) is $$T_a = (1+r_i)\cdot T_o$$
$$= I_w\cdot\frac{2(1+r_i)^2\cdot(n_a\cdot 2\pi/60)}{\Delta t}$$
$$= [2(1+r_i)^2]I_w\cdot\frac{(n_a\cdot 2\pi/60)}{\Delta t},$$

the electric variable inertia apparatus must to be driven with a power, $$P = T_a\cdot\omega_a = [2[(1+r_i)^2]I_w\cdot\frac{(n_a\cdot 2\pi/60)^2}{\Delta t}.$$

Therefore, the electric variable inertia apparatus generates an inertia that is magnified $2(1+r_i)^2$ times. Additionally, the responsive time of the external motor, $\Delta t$, can be further decreased by adoption of a suitable servo drive device.

(3) When the servo drive device (100) controls the rotational velocity of the ring gear (230) from $n_r=0$ to $$n_r = -\frac{2(1+r_i)}{1+2r_i} \cdot n_a,$$

the kinetic energy storing device (301) rotates at a high speed, $n_o=n_s=4(1+r_i)\cdot n_o$, and the alternate angular velocity in rad/s (Radians per second) and the torque at the load terminal are $$\Delta\omega = \omega_3 - \omega_2$$
$$= \{[4(1+r_i)\cdot n_a] - [2(1+r_i)\cdot n_a]\} \cdot 2\pi/60$$
$$= 2(1+r_i)\cdot(n_a \cdot 2\pi/60).$$
$$T_o = I_w \cdot \frac{\Delta\omega}{\Delta t} = I_w \cdot \frac{2(1+r_i)\cdot(n_a \cdot 2\pi/60)}{\Delta t}$$

Neglecting the terms containing $T_r$, $\alpha_a$, $\alpha_r$, $\alpha_s$ or $\alpha_p$, a torque that the load terminal exerts back to the input terminal, the external drive shaft (225) is $$T_a = (1+r_i)\cdot T_o$$
$$= I_w \cdot \frac{2(1+r_i)^2 \cdot (n_a \cdot 2\pi/60)}{\Delta t}$$
$$= [2(1+r_i)^2]I_w \cdot \frac{(n_a \cdot 2\pi/60)}{\Delta t}.$$

The electric variable inertia apparatus must be driven with a power, $$P = T_a \cdot \omega_a = [(1+r_i)^2]I_w \cdot \frac{(n_a \cdot 2\pi/60)^2}{\Delta t}.$$

only consider the mechanical transmission, the electric variable inertia apparatus causes an inertia to increase $2(1+r_i)^2$ times. Thus, during the rotational velocity of the ring gear (230) increasing from $$n_r = \frac{2(1+r_i)}{1+2r_i} \cdot n_a \text{ to } n_r = -\frac{2(1+r_i)}{1+2r_i} \cdot n_a,$$

the inertia that the load terminal reacts to the input terminal is magnified to $4(1+r_i)^2$ times. Assuming that the pitch radius of the planet gear (222) equals the pitch radius of the sun gear (211), $r_i=1$, the inertia $T_a$ is magnified to 16 times. If the pitch radius of the planet gear (222) is half the pitch radius of the sun gear (211), $r_i=2$, the inertia $T_a$ is magnified to 36 times.

By appropriately rotating the external rotor at a proper rotational velocity according to the rotational velocity of the planetary frame (221) connected to the external input device (900), the kinetic energy storing device (301) is rotated at a specific rotational velocity to generate a proper inertia to react to the input device.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An electric variable inertia apparatus comprising:
   a housing assembly having
      a housing having a closed rear and an open front;
      a positioning assembly mounted securely in the housing and having
         a base mounted securely in the housing and having
            a front,
            a rear,
            a cavity formed coaxially in and communicating with the rear of the base; and
            a central hole formed coaxially through the front of the base, communicating with the cavity and having
               a narrow end communicating with the front of the base; and
               a broad end communicating with the cavity; and
         a rear shaft bearing mounted in the broad end of the central hole; and
   a cover assembly mounted securely on the open front of the housing and having
      a cover mounted securely on the open front of the housing and having
         a central hole formed through the cover; and
         a frame shaft bearing mounted in the central hole in the cover;
   a servo drive device to provide a variable rotatory driving force, being an external motor mounted in the housing between the base and the cover and having
      an internal stator including a coil assembly, and
      an external rotor being mounted rotatably around the internal stator and having
         a tubular body mounted rotatably around the internal stator and having
            an inner surface,
            a front end, and
            a rear end,
         a flange formed on and protruding radially out from the front end of the tubular body, and
         a magnet assembly mounted on the inner surface of the tubular body near the front end of the tubular body rotatably around the coil assembly of the internal stator;
   a planetary gear mechanism mounted in the housing between the external motor and the cover and having
      a ring gear being mounted securely on and simultaneously rotating with the external rotor of the servo drive device and having a toothed inner surface,
      a planet gear assembly being mounted in and engaging the ring gear and having
         a planetary frame connected to an external input device, mounted in the housing and having an external drive shaft protruding out of the frame shaft bearing in the cover; and
         multiple planet gears being mounted on the planetary frame and meshing with the toothed inner surface of the ring gear, and
      a sun gear assembly having
         a rotated shaft mounted through the rear shaft bearing in the broad end of the central hole in the base and having a front end and a rear end, and
         a sun gear being mounted securely on the front end of the rotated shaft and meshing with the planet gears; and a load assembly being a flywheel connected securely to the rear end of the rotated shaft of the sun gear assembly and rotating simultaneously with the rotated shaft to generate rotational inertia;

whereby, by controlling the servo drive device connected with the ring gear at a specific rotational velocity according to the rotational velocity of the planetary frame connected to the external input device, the load assembly is rotated to generate a widely ranging rotational inertia to react to the external input device.

2. The electric variable inertia apparatus as claimed in claim 1, wherein the positioning assembly further has
- a sleeve mounted securely on the front of the base and
- a retaining disk mounted securely on the sleeve and having a central hole formed through the retaining disk, and the rotated shaft is mounted through the sleeve and the central hole in the retaining disk.

\* \* \* \* \*